No. 615,608. Patented Dec. 6, 1898.
T. COLEMAN, Jr.
APPARATUS FOR MANUFACTURING GLASSWARE.
(Application filed Apr. 1, 1898.)
(No Model.) 3 Sheets—Sheet 3.

UNITED STATES PATENT OFFICE.

THOMAS COLEMAN, JR., OF ROCHESTER, PENNSYLVANIA.

APPARATUS FOR MANUFACTURING GLASSWARE.

SPECIFICATION forming part of Letters Patent No. 615,608, dated December 6, 1898.

Application filed April 1, 1898. Serial No. 676,031. (No model.)

*To all whom it may concern:*

Be it known that I, THOMAS COLEMAN, Jr., a citizen of the United States, residing at Rochester, in the county of Beaver and State of Pennsylvania, have invented or discovered certain new and useful Improvements in Apparatus for the Manufacture of Glassware, of which improvements the following is a specification.

The invention described herein relates to certain improvements in apparatus for the manufacture of glassware, and has for its object a construction and arrangement of mechanism whereby a blowpipe may be held and rotated with its axis in line with the axis of the mold during the expanding of the glass to conform with the mold and whereby the mold may be lowered into and raised from a tank containing water, so as to prevent excessive heating of the mold.

In general terms the invention consists in electrically-controlled means for holding and rotating the blowpipe in operative position for controlling the admission of air under pressure for opening, closing, and lowering and raising the mold.

Figure 1:
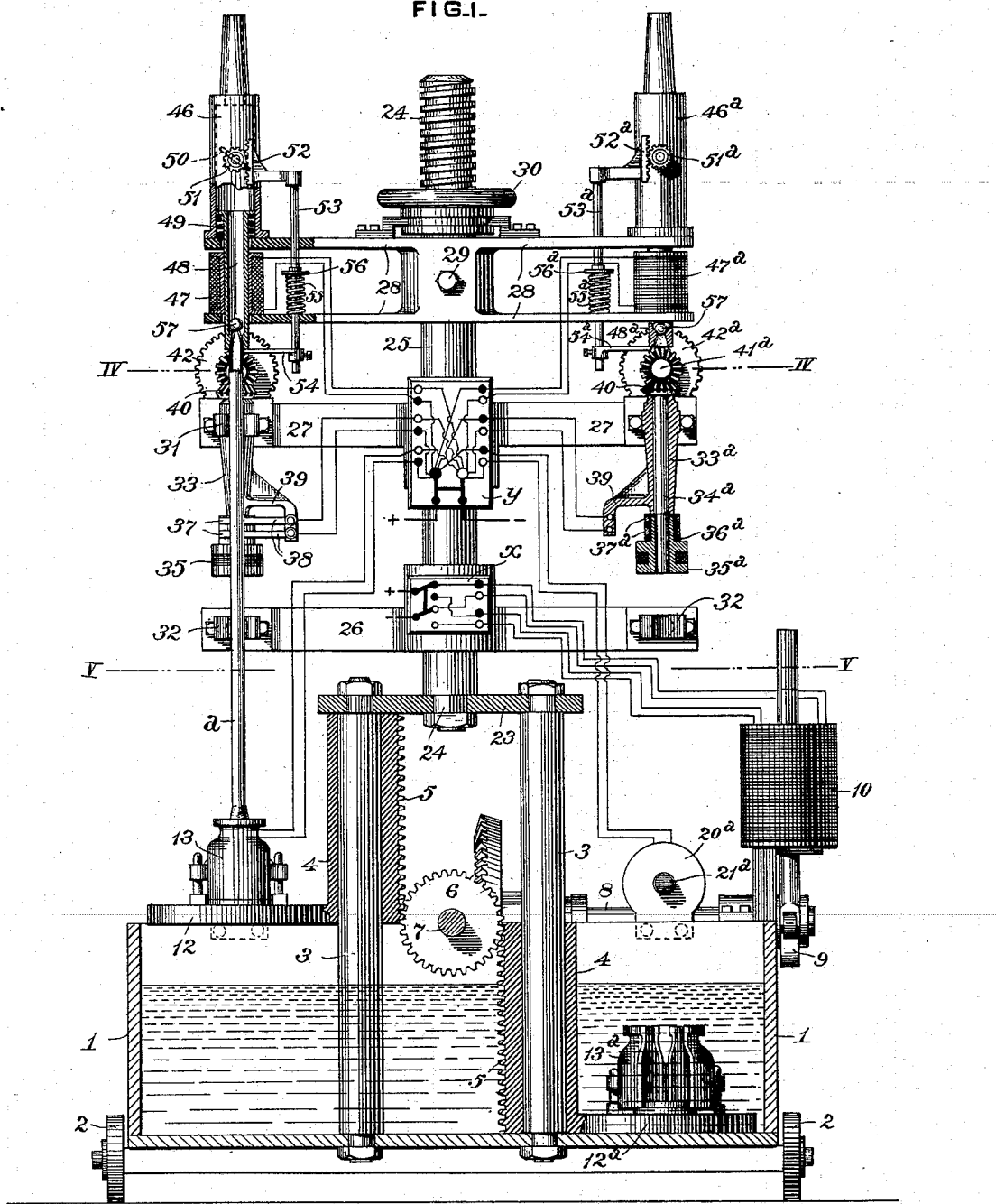
Figure 2:
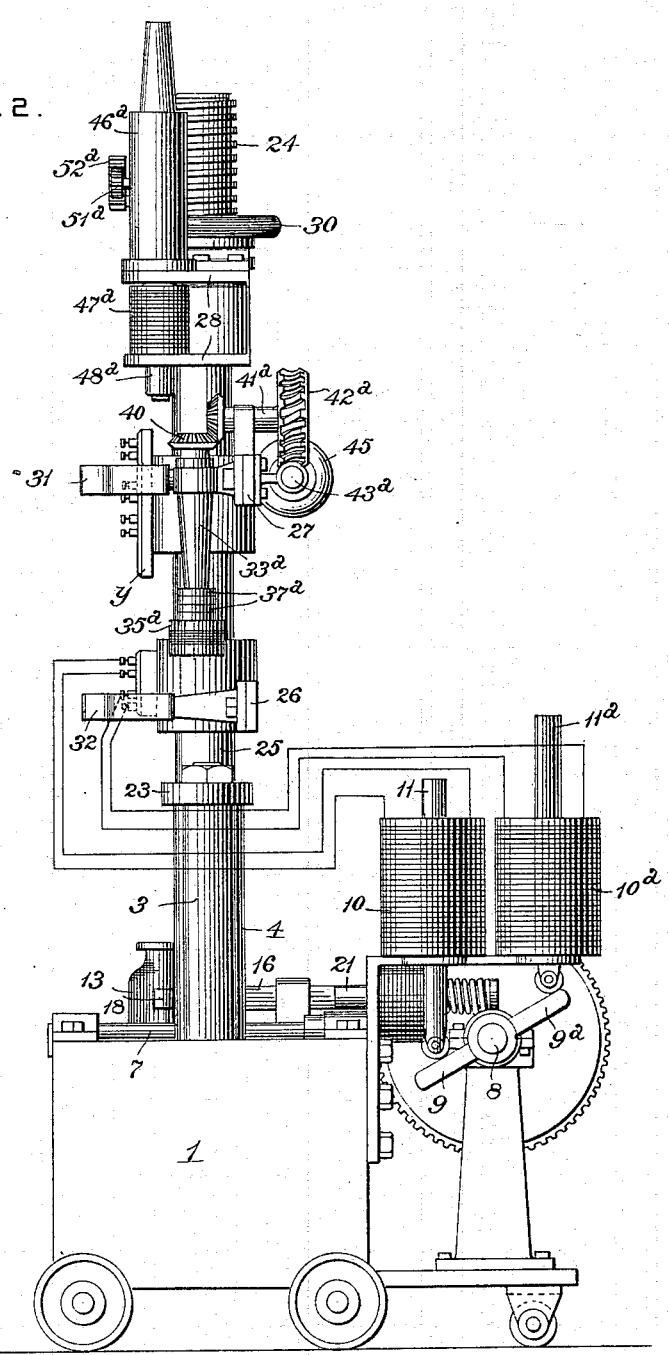
Figure 3:
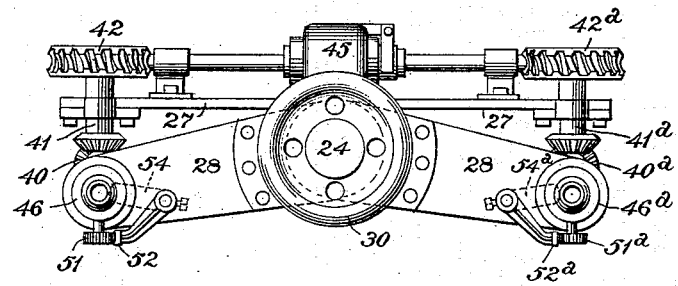
Figure 4:
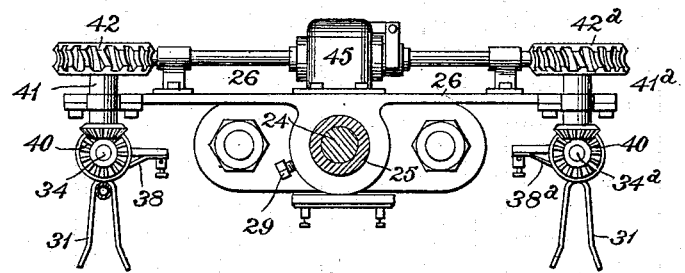
Figure 5:
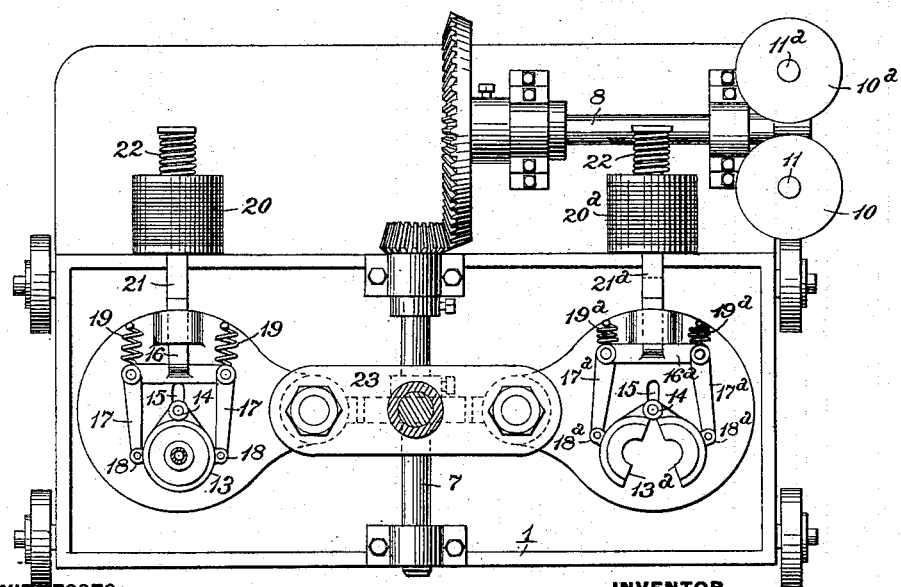

In the accompanying drawings, forming a part of this specification, Figure 1 is a view, partly in elevation and partly in section, of my improved apparatus. Fig. 2 is a side elevation of the same. Fig. 3 is a top plan view; and Figs. 4 and 5 are sectional plan views, the planes of section being indicated, respectively, by the lines IV IV and V V, Fig. 1.

In the practice of my invention it is preferred to mount the tank 1 upon wheels 2 to facilitate its being moved from place to place. Posts or standards 3 are secured to the bottom of the tank, the posts serving as guides for the sleeves 4, which are provided with teeth 5, adapted to intermesh with the gear-wheel 6, as clearly shown in Fig. 1. This gear-wheel is secured on one end of a shaft 7 and a bevel-pinion on the opposite end, said pinion intermeshing with a pinion on the shaft 8, which has oppositely-projecting arms 9 and 9ª secured on its outer end. Solenoids 10 and 10ª are so mounted on the tank that the plungers or bars 11 11ª, forming the armatures of the solenoids, will be in line with the arms 9 and 9ª. The solenoids are connected by independent circuits to a switch mechanism, (indicated at $x$,) which may be of any suitable construction whereby the solenoids can be alternately excited to oscillate the shaft 8, and thereby alternately raise and lower the sleeves 4. On these sleeves are secured the platforms 12 and 12ª, and on the platforms are mounted the sectional molds 13 and 13ª. The pins or pintles 14 of the hinge-joints of the molds pass through slots 15 in the platforms. By the employment of slots different sizes of molds can be attached to the platforms, with their axes in line with the axes of the blowpipes when held in operative positions, as hereinafter described.

On the platforms 12 and 12ª are mounted slides 16 and 16ª, each provided with oppositely-projecting arms which have their outer ends connected by links 17 and 17ª to ears 18 and 18ª, formed on the mold-sections. Springs 19 and 19ª have one end attached to the platforms and their opposite ends connected to the slide or cross-head with sufficient tension to shift the cross-heads, and thereby move the mold-sections apart to permit of the removal of an article inclosed therein. In order to close the molds, solenoids 20 and 20ª are so secured to the sides of the tank 1 that the bars or plungers 21 21ª, forming the armatures of the solenoids, will be in line with the slides 16 and 16ª when the platforms have been raised to operative positions. It is preferred to arrange springs 22 around the armatures of the solenoids, so as to draw the armatures backward when the solenoids are deënergized; but ordinarily the springs 19 19ª will effect such reverse movement of the armatures. These solenoids are connected by independent circuits to a switch mechanism, (indicated at $y$,) which is adapted to alternately connect the solenoids to a suitable generating-circuit.

A plate or beam 23 is connected to the upper ends of the posts or standards 3, and to this plate, preferably midway of the posts or standards 3, is secured a post or standard 24. On this post or standard is mounted a sleeve 25, and on the sleeve brackets 26, 27, and 28 are adjustably secured by means of set-screws 29, thereby permitting of the adjustment of the brackets with relation to each other. The upper end of the post or standard 24 is threaded for the reception of an adjusting-nut 30, connected with the freedom of rotation to the upper bracket 28, whereby the several brackets may be simultaneously adjusted with relation to the molds when in operative position. As clearly shown in Figs. 1 and 2, the brackets 26 and 27 are provided with outwardly-projecting arms 31 and 32, having their outer ends forked, so as to form guide-fingers properly to direct and support the blowpipe $a$, with their axes in line with the axes of the molds. The bracket 27 is provided with vertically-arranged bearings 33 33$^a$, and through these bearings are passed the shafts 34 and 34$^a$, as clearly shown in Fig. 1. On the lower ends of the shafts 34 34$^a$ are secured electromagnets 35 and 35$^a$, having circular pole-pieces. These magnets are insulated from the shafts and are provided with upwardly-projecting annular extensions 36$^a$, which are covered with suitable insulating material. On this insulating material are secured the bands 37 and 37$^a$, which are connected to the opposite ends of the coils of the electromagnet. Springs 38 and 38$^a$ are so secured to arms 39, formed on the bearings 33 and 33$^a$, as to bear upon the contact-bands 37 37$^a$. These springs are connected by suitable circuits to the switch mechanism $y$, so that the electromagnets may be alternately energized. Bevel-pinions 40 are secured to the upper ends of the shafts 33 and 33$^a$ and intermesh with correspondingly-shaped pinions on the shafts 41 and 41$^a$, which have worm-wheels 42 and 42$^a$ secured to their opposite ends. Worms 43 and 43$^a$, formed on the shaft 44, intermesh with the wheels 42 and are driven by a motor 45, of any suitable construction, secured to the bracket 27 and having its armature formed on or secured to the shaft 44.

The bracket 28 is preferably formed with two arms, as shown, and on the upper arm are secured cylinders 46 and 46$^a$, which are connected in any suitable manner to a source of fluid under pressure. On the lower arms are secured solenoids 47 and 47$^a$, with their axes in line with the cylinders 46 and 46$^a$. The armatures of these solenoids are formed by tubes 48 and 48$^a$, of such a length as to extend into the cylinders 46 and 46$^a$ and also to project below the lower arms of the bracket 28. The tubes 48 are provided with heads at their upper ends, and between these heads, which lie within the cylinders 46 46$^a$ and the upper arms of the bracket 28, are interposed springs 49, adapted to raise and support these tubular armatures when the solenoids are deënergized. The lower ends of the tubular armatures are provided with conical seats for the reception of the upper ends of the blowpipes $a$. Within the cylinders 46 and 46$^a$ are arranged valves 50 50$^a$, whose operating-stems project through the walls of the cylinders and have pinions 51 51$^a$ mounted thereon. These pinions intermesh with racks 52 52$^a$, mounted upon rods 53 and 53$^a$, passing down through the arms of the bracket 28. On the lower ends of the bars 53 and 53$^a$ arms 54 and 54$^a$ are adjustably mounted, and are made of such a length as to project into the path of movement of the tubular armatures, so that when the latter are drawn down on the energizing of the solenoids the rods 53 and 53$^a$ will be moved downwardly, so as to open the valves in the cylinders. Springs 55 and 55$^a$ are interposed between collars 56 and 56$^a$ on the rods 53 and 53$^a$ and any stationary support or abutment, as the lower arms of the bracket 28, so as to raise these rods and close the valve when the tubular armatures are raised by the springs 49 and 49$^a$. It is preferred to arrange check-valves in the form of balls 57 57$^a$ within the tubular armatures, so as to prevent the escape of air until the valves are displaced by the upper ends of the blowpipes, when the tubular armatures are forced down over the same. When employing these check-valves, the upper ends of the blowpipes are provided with slots or openings in their upper ends for the admission of air, as clearly shown in Fig. 1.

It will be readily understood by those skilled in the art that any other form or construction of valve mechanism adapted to be operated by the movement of the tubular armature may be substituted for that shown and described, and in some instances the valve mechanism may be entirely omitted, the escape of air being controlled by the check-valves 57, which will prevent the escape of air except when it is displaced by the blowpipe, as described, and when so displaced the flow of air is desired.

In describing the operation of my apparatus it will be supposed that an article has been completed in the mold at the left of Fig. 1 and it is desired to open the mold and remove the article and to raise the opposite mold from the tank, so that an article may be formed therein. The switch mechanism $y$ is first shifted, so as to open the circuits through the solenoid 47, thereby permitting the tubular armature 48 to be raised by its spring to free the upper end of the blowpipe and to cut off the flow of air through such armature. The circuit through the rotating magnet 35 is also broken to permit of the removal of the blowpipe from its guide-arms, and the circuit through the solenoid 20 is broken to permit the springs 19 to open the mold for the removal of the blowpipe and the article. These several circuits are preferably broken simultaneously. As soon as the article has been removed from the mold the switch mechanism $x$ is so operated that the circuit through one of the solenoids 10 or 10$^a$ is broken and that through the other is completed, so as to lower the platform 12 and raise the platform 12$^a$, with its mold, to operative position. A blowpipe with a gather of glass at one end is now placed in position in the guide-arms with a gather within the mold. The switch mechanism $y$ is shifted, so as to close the circuits through the solenoids 20$^a$ and 47$^a$ and through the rotating magnet 35$^a$, thereby simultaneously closing the mold-sections, drawing down the tubular solenoid 48ª, opening the valve in the cylinder 46, and drawing the blowpipe with such force against the rotating magnet that the latter will impart a rotation to the blowpipe and the gather of glass within the mold.

It is characteristic of my improved machine that the blowpipe, which is formed of magnetic material, as steel or iron, serves as an armature for the rotating magnet and is held thereby with a freedom of rotation, the magnet serving not only to hold the pipe in position, but also to rotate it. It is also characteristic of my improvement that the movement of the tube to connect the blowpipe to a source of fluid under pressure also shifts the valve or valves controlling the flow of fluid. By an adjustment of the arms 54 54ª on the rods 53 53ª so that the tubular armatures will strike them sooner or later in their movements the extent to which the valves 50 50ª are opened can be regulated.

I claim herein as my invention—

1. In a machine for the manufacture of glassware, the combination of a mold, a blowpipe and a rotating magnet arranged in such relation to the mold as to support the blowpipe in operative relation to the mold and impart a rotation to the blowpipe while so held, substantially as set forth.

2. In a machine for the manufacture of glassware, the combination of a mold, a blowpipe, a rotating magnet arranged in such relation to the mold as to support the blowpipe in operative relation to the mold and impart a rotation to the blowpipe while so held, and electrically-actuated mechanism for controlling the flow of fluid under pressure to the blowpipe, substantially as set forth.

3. In a machine for the manufacture of glassware, the combination of a mold, electrically-controlled mechanism for opening and closing the mold, a blowpipe and a rotating magnet arranged in such relation to the mold as to support the blowpipe in operative relation to the mold, and impart a rotary movement to the blowpipe, while so held, substantially as set forth.

4. In a machine for the manufacture of glassware, the combination of a mold, a blowpipe, an electromagnet for supporting the blowpipe in operative relation to the mold and means for imparting a rotary movement to the blowpipe while so held, substantially as set forth.

5. In a machine for the manufacture of glassware, the combination of a mold, a blowpipe, a source of fluid under pressure and electrically-controlled means for connecting the blowpipe with the source of fluid under pressure, substantially as set forth.

6. In a machine for the manufacture of glassware the combination of a mold, a blowpipe, a vertically-movable tube adapted to engage the end of the blowpipe connected to a source of fluid under pressure, and electrically-controlled means for shifting the tube into engagement with the blowpipe and permitting the flow of fluid-pressure, substantially as set forth.

7. In a machine for the manufacture of glassware, the combination of a mold, a blowpipe, a solenoid having a tubular armature adapted to be connected to the blowpipe, and connected to a source of fluid under pressure, and a valve controlling the flow of fluid-pressure and adapted upon the movement of the armature into engagement with the blowpipe, to permit the flow of fluid-pressure, substantially as set forth.

8. In a machine for manufacturing glassware the combination of a mold, a blowpipe, an electromagnet having circular poles, and means for rotating the magnet, substantially as set forth.

9. In a machine for the manufacture of glassware, the combination of a sectional mold, and electrically-controlled means for opening and closing the mold, substantially as set forth.

10. In a machine for the manufacture of glassware, the combination of a sectional mold, a slide connected to the mold-sections, springs for shifting the slide in one direction, and a solenoid for shifting the slide in the opposite direction, substantially as set forth.

11. In a machine for the manufacture of glassware, the combination of a tank, a mold-supporting platform movable up and down in the tank, electrically-operated mechanism for shifting the platform, substantially as set forth.

12. In a machine for manufacturing glassware, the combination of a sectional mold, electrically-controlled means for opening and closing the mold, a blowpipe, a rotary magnet adapted to hold and rotate the blowpipe in operative position, a vertically-movable tube connected with a source of fluid under pressure, a valve controlling the flow of fluid-pressure through the tube and electrically-controlled means for shifting the tube into engagement with the blowpipe and simultaneously opening the valve, substantially as set forth.

In testimony whereof I have hereunto set my hand.

THOMAS COLEMAN, JR.

Witnesses:
DARWIN S. WOLCOTT,
F. E. GAITHER.